Figure 1:
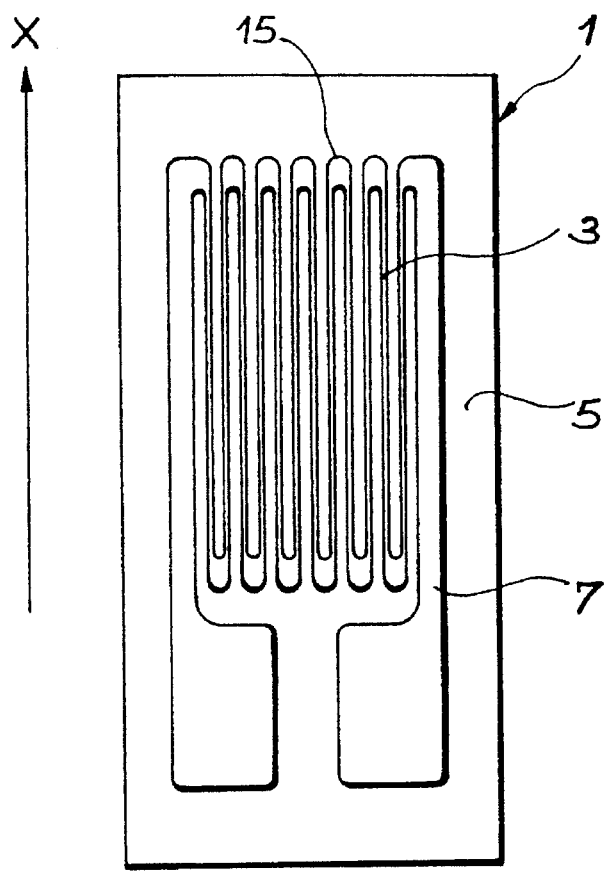

United States Patent [19]
Grange et al.

[11] Patent Number: 5,508,676
[45] Date of Patent: Apr. 16, 1996

[54] STRAIN GAUGE ON A FLEXIBLE SUPPORT AND TRANSDUCER EQUIPPED WITH SAID GAUGE

[75] Inventors: Hubert Grange, Grenoble; Catherine Maeder, Meylan, both of France

[73] Assignee: Commissariat a L'Energie Atomique, France

[21] Appl. No.: 204,360

[22] PCT Filed: Jul. 15, 1993

[86] PCT No.: PCT/FR93/00721

§ 371 Date: Mar. 11, 1994

§ 102(e) Date: Mar. 11, 1994

[87] PCT Pub. No.: WO94/02815

PCT Pub. Date: Mar. 2, 1994

[30] Foreign Application Priority Data

Jul. 15, 1992 [FR] France ................... 92 08723

[51] Int. Cl.[6] ................................................. G01L 1/22
[52] U.S. Cl. ............................................ 338/2; 73/862.629
[58] Field of Search ........................... 338/2, 3, 4, 5; 73/862.627, 862.629, 726, 720; 177/168

[56] References Cited

U.S. PATENT DOCUMENTS

| | | | |
|---|---|---|---|
| 3,709,310 | 1/1973 | Cooke et al. | 177/168 |
| 4,511,877 | 4/1985 | Nishikawa et al. | 338/2 |
| 4,633,212 | 12/1986 | Johnson | 338/2 |
| 4,821,011 | 4/1989 | Kotaki et al. | |
| 4,839,708 | 6/1989 | Kano et al. | |
| 4,876,893 | 10/1989 | Kato et al. | |
| 4,939,496 | 7/1990 | Destannes | 338/2 |
| 5,222,398 | 6/1993 | O'Brien | 73/862.632 |

FOREIGN PATENT DOCUMENTS

| | | | |
|---|---|---|---|
| 0087665 | 2/1983 | European Pat. Off. | G01L 1/22 |
| 0265090 | 9/1987 | European Pat. Off. | G01L 1/10 |
| 0314541 | 10/1988 | European Pat. Off. | G01L 1/22 |
| 0451636 | 3/1991 | European Pat. Off. | G01D 5/16 |
| 55029756 | 3/1980 | Japan | G01L 1/22 |
| 60-072242 | 4/1985 | Japan | H01L 21/74 |
| 63-037227 | 2/1988 | Japan | G01L 1/22 |
| 3122504 | 5/1991 | Japan | G01B 7/18 |

*Primary Examiner*—Teresa J. Walberg
*Assistant Examiner*—Raphael Valencia
*Attorney, Agent, or Firm*—Hayes, Soloway, Hennessey, Grossman, & Hage

[57] ABSTRACT

Strain gage disposed on a flexible support and probe fitted with the gage. A gage with its creep being adapted according to the test body and the application required, without having to change the mask for etching the strain-sensitive thin film. A strain gage fitted to one of the surfaces of a test body capable of deformation under the action of a quantity to be measured. The gage comprises a strain-sensitive thin film (22) etched in the form of a resistance and fitted to a flexible support (20), the film (22) comprising at least two underlying films (24, 26) having different creep values.

21 Claims, 3 Drawing Sheets

STRAIN GAUGE ON A FLEXIBLE SUPPORT AND TRANSDUCER EQUIPPED WITH SAID GAUGE

DESCRIPTION

The present invention relates to a strain gauge on a flexible support, as well as to a transducer equipped with said gauge.

Strain gauges on a flexible support are used for measuring the deformations of mechanical parts. They have numerous applications. They are in particular used for weighing (e.g. commercial and bathroom scales), for pressure measurements, for stress measurements on mechanical parts such as transmission shafts, different portions of an aircraft wing or concavities. They are also used in extensometry for the inspection of concrete structures, such as dams or bridges. Finally, these gauges can also be used for performing torsion, torque, vibration or acceleration measurements.

In its most simple form, the gauge 1 is constituted by a very thin strand 3 bonded to a thin support 5 and arranged in the form of loops shown in FIG. 1, i.e. most of its length is located parallel to a fixed direction (arrow X). Larger strands 7 are used for welding the outlets for cables for connecting to instruments.

When it is wished to know the elongation of a structure in a given direction, bonding takes place of the gauge 1 with the strands parallel to said direction. The gauges 1 are also used for producing transducers 9, such as is illustrated in the attached FIG. 2. A transducer is a mechanical device for transforming a random physical quantity A (pressure, force, acceleration, etc.) into a deformation of a part 11 known as the test body. Gauges bonded to test bodies detect its deformations with a view to the measurement of the physical quantity A or for acting on regulating devices.

Figure 2:
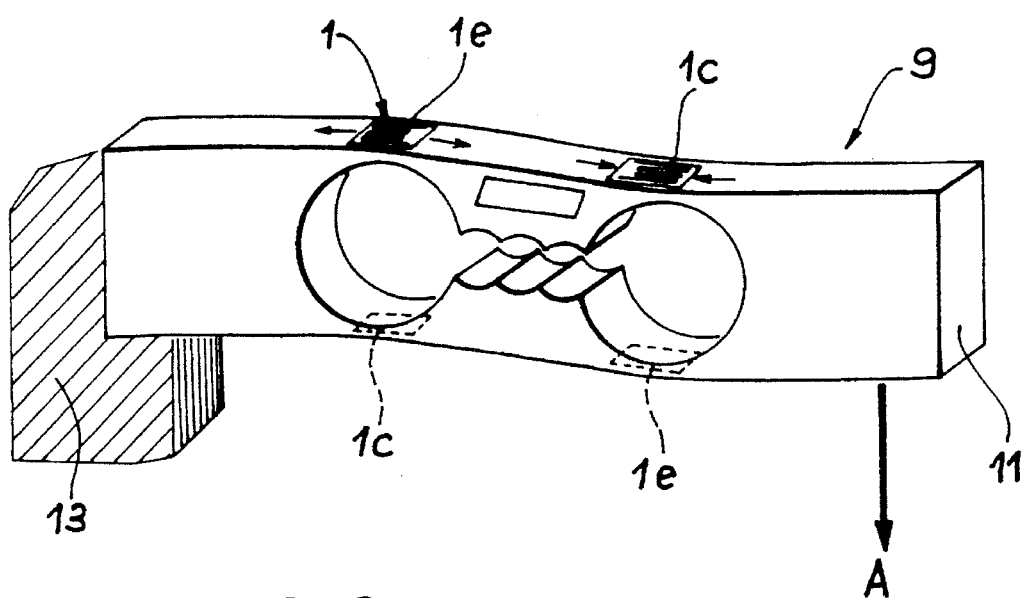

In the case illustrated in FIG. 2, the two gauges 1c operate in compression and the two gauges 1e in extension. This makes it possible to obtain very accurate measurements of approximately $10^{-4}$ of the extent of the measurement. The same arrangement can be used on all types of structures, as described in "L'encyclopédie Vishay d'analyse des contraintes", Vishay-Micromesures, Malakoff, France, 282–284.

Finally, the gauges can be arranged in the form of a Wheatstone bridge, as is described e.g. in EP-A-53 059.

No matter what the arrangement of the strain gauges, the measurements performed are all based on resistance variations of the strand 3, said variations being a function of the type of material forming it or its length and section formations.

EP-A-53 059 discloses a strain gauge, obtained by the vacuum deposition of a metal alloy coating of 50 to 500 nm on a 100 to 250 µm thick glass substrate. However, glass is extremely brittle and is difficult to use in certain cases. Therefore this gauge can be used only in compression and not in tension due to the ultimate strength of the glass.

The prior art also discloses strain gauges to be used in compression and extension and which for this purpose are fixed to a flexible support. These gauges have a thin film of polyimide or phenolic epoxy resin with a thickness of 25 µm and to this is bonded a very thin sheet of approximately 5 µm of a laminated resistive material such as an alloy of nickel-chromium, nickel-copper or platinum-tungsten.

In this case, the resistive layer is then etched in fine strip form in order to obtain a resistor, whose shape can be gathered from the enclosed FIG. 1. The resulting resistors can have values between 120 and 6000 ohms.

This type of gauge suffers from a certain number of disadvantages. It is difficult to manufacture the gauges, because the bonding of very thin sheets of resistive material is a complicated operation, which it is difficult to reproduce. The manufacture of 5 µm thick metal sheets also takes a long time and is difficult, because it requires a succession of rolling and annealing operations for stabilizing the material between each rolling stage. Finally, the thickness of the 5 µm resistive metal coating limits the values of the resistors obtained, which generally do not exceed 6000 ohms.

U.S. Pat. No. 4,786,887 discloses a gauge having a flexible substrate covered with a polymeric insulating layer and a resistive, nickel - chromium alloy layer, a gold conducting layer also being placed solely on the outlet tabs in order to form contact studs. This document proposes adjusting the creep of the test body by modifying the characteristics of the insulating layer.

Moreover, under the action of a constant force, the test body 11 and the gauge 1 instantaneously deform at the time of applying the said force, but continue to progressively deform over a period of time i.e. the so-called creep phenomenon. When the force is removed from the test body 11, the latter returns to its initial position. The creep value is measured by forming the ratio between the length variation of the element subject to creep and its initial length.

In the same way, following the instantaneous deformation of the gauge 1, which follows that of the test body 11, the gauge 1 is subject to a force opposing said deformation and this constitutes the so-called relaxation phenomenon. The latter corresponds to a reduction of the stress or strain exerted on the gauge, when the deformation is kept constant.

In general terms, a gauge 1 fixed to a test body 11 to which is applied a load A is subject to three different deformations:

an instantaneous deformation corresponding to the load application, a deformation due to the creep of the test body and a deformation due to its inherent relaxation.

The result of the measurement performed with the aid of the gauge corresponds to the resultant of these three deformations. However, the creep or relaxation characteristics are adapted as a function of the applications of the gauges.

In the case of the strain gauge shown in FIGS. 1 and 2, the transmission of the deformations of the test body 11 to the gauge I takes place by cutting the connecting loops 15 between the successive strands 3, at the ends thereof.

When it is wished to measure the evolution of the creep of a structure under a constant load, such as e.g. a bridge, the gauge must be without relaxation. However, the relaxation of the gauge 1 is dependent on the length of the loops 15, the shorter the loops 15 the greater the relaxation of the gauge. Thus, the relaxation of the gauge is adapted by choosing the length of the loops. This makes it necessary, prior to manufacture, to calculate the length of the loops for each test body used. It is then necessary to have one gauge designed per test body and one etching mask per test body. Therefore the manufacturing process is onerous.

EP-A-53 059 makes no reference to the problem of regulating the creep, because the sought application is mainly general public weighing (bathroom and domestic scales), where the necessary accuracy is less than in the case of the weighing measurements performed in the professional sector. For general public transducers, the errors due to creep fall within the measurement tolerance ranges.

However, when the gauges are used for a precise measurement, the design of the gauge 1 must make it possible to have a relaxation perfectly compensating the creep of the test body 11, so as to have a constant output signal. Such an accuracy is necessary to ensure that the weight reading is constant, no matter what the duration of the weighing operation.

U.S. Pat. No. 4,876,893 also discloses a strain gauge for a pressure transducer. This gauge comprises an electrically insulating, base plate (insulated metal or glass), covered with a single thin alloy film. The preferred composition of said alloy is as follows: $(Ni_aCr_{100-a})_{100-b}Sib$ with a between 40 and 60% and b between 3 and 8% by weight. However, this document makes no reference to the creep problem.

In general terms, the creep and relaxation phenomena are not very important at ambient temperature, but may no longer be negligible when the test body and/or adhesive bonding the gauge to said body are heated to temperatures close to their use limits. This effect is reduced by making the assembly undergo a heat treatment at a temperature higher than that of the subsequent use. This is important, particularly in the case of transducers which must have a fidelity better than 0.1%. However, such heat treatments are expensive.

Moreover, it is possible for the test body 11 to have an expansion coefficient differing very significantly from that of the gauge 1. As the bonding was definitive at the adhesive treatment temperature, on returning to the ambient temperature the gauge is subject to a deformation. Therefore the true zero does not correspond to the load absence case, but instead to that of a load under the bonding conditions. Thus, certain installations creep in the absence of a load, but not for a given deformation.

Finally, it is known that a resistance can vary as a function of the temperature in accordance with the following formula:

$$R=Ro(1+\alpha T)$$

in which Ro represents the value of the resistance of the gauge at a reference temperature, T represents the temperature at the time of the measurement and $\alpha$ represents the temperature coefficient of resistance (TCR) of the material in which the resistor is produced (strands 3). When the TCR is close to zero, the resistance value does not vary as a function of the temperature.

It would therefore be desirable to produce gauges from materials having a TCR close to zero.

The metrological qualities of a gauge and a transducer are largely dependent on the control of the creep phenomena.

Therefore the invention aims at obviating the aforementioned disadvantages and more particularly at permitting the adaptation of the creep of the gauge to different test bodies, whilst maintaining a temperature coefficient of resistance close to zero and without it being necessary to modify the design of the mask making it possible to produce the loops for each test body.

The invention therefore relates to a strain gauge for fixing to one of the faces of a test body able to deform under the action of a quantity to be measured, said gauge incorporating a thin film sensitive to deformations etched in resistor form and fixed to a flexible support.

According to the features of the invention, said thin film incorporates at least two underlying films having different creep values.

Advantageously, the film has a multifilm structure with several films having different creep values and different thicknesses.

Thus, it is possible to adapt the degree of relaxation or creep of the gauges by varying the nature of the thin films, their number and their thickness.

Advantageously, one of the underlying films has a positive creep value and it is an alloy in the amorphous state with a TCR close to zero, whereas the other underlying film has a negative creep value and it is an alloy in the crystalline state, whose TCR is also close to zero.

The invention also relates to a transducer for measuring a quantity. According to features of the invention, it comprises at least one strain gauge according to the invention fixed to a test body able to deform under the action of the said quantity to be measured.

The invention is described in greater detail hereinafter relative to non-limitative embodiments and with reference to the attached drawings, wherein show:

FIG. 1 A diagram illustrating a prior art strain gauge in plan view.

FIG. 2 A perspective view of a transducer having several prior art gauges.

Figure 3:
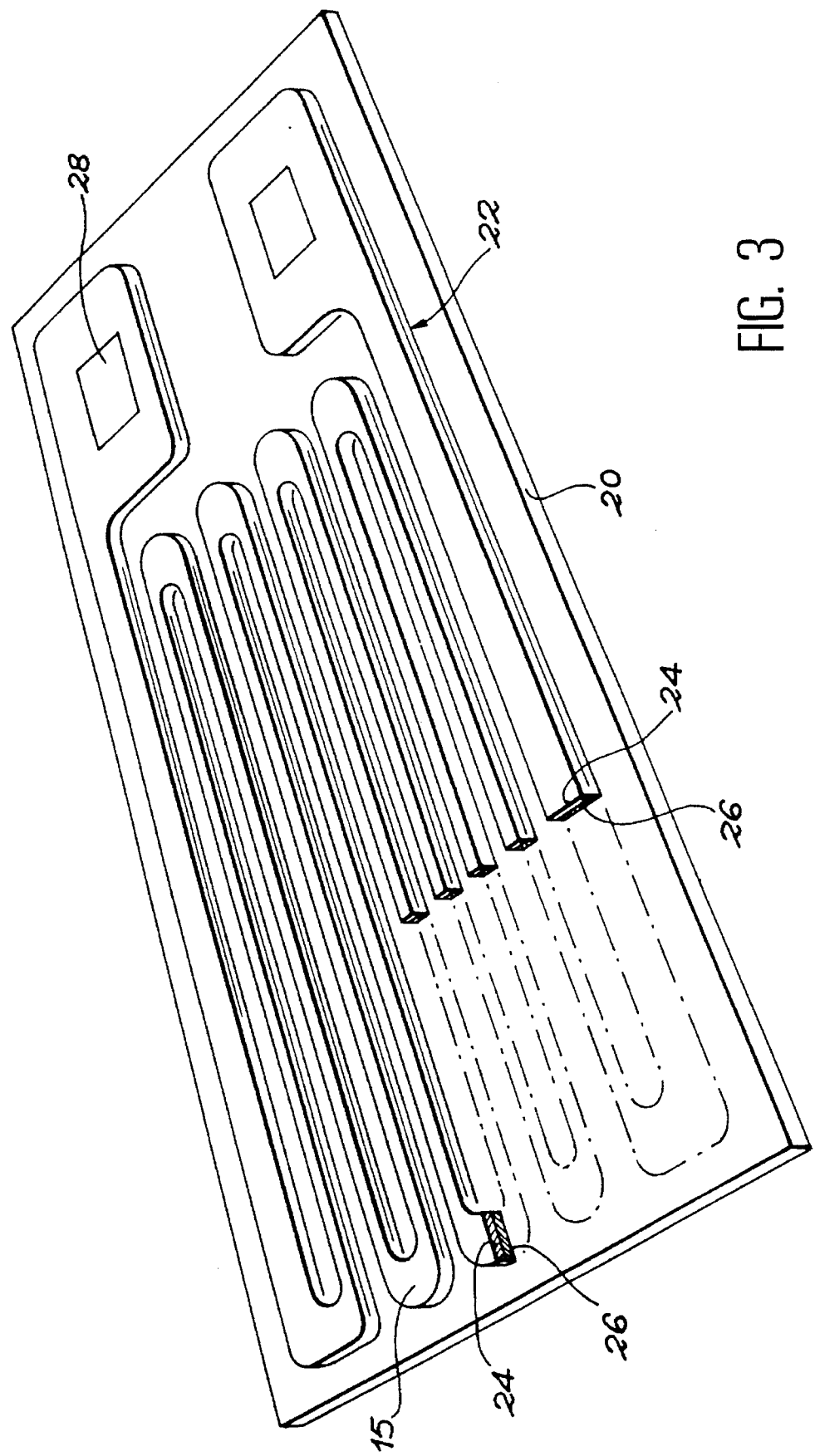

FIG. 3 A part perspective view of an embodiment of a strain gauge according to the invention.

Figure 4:
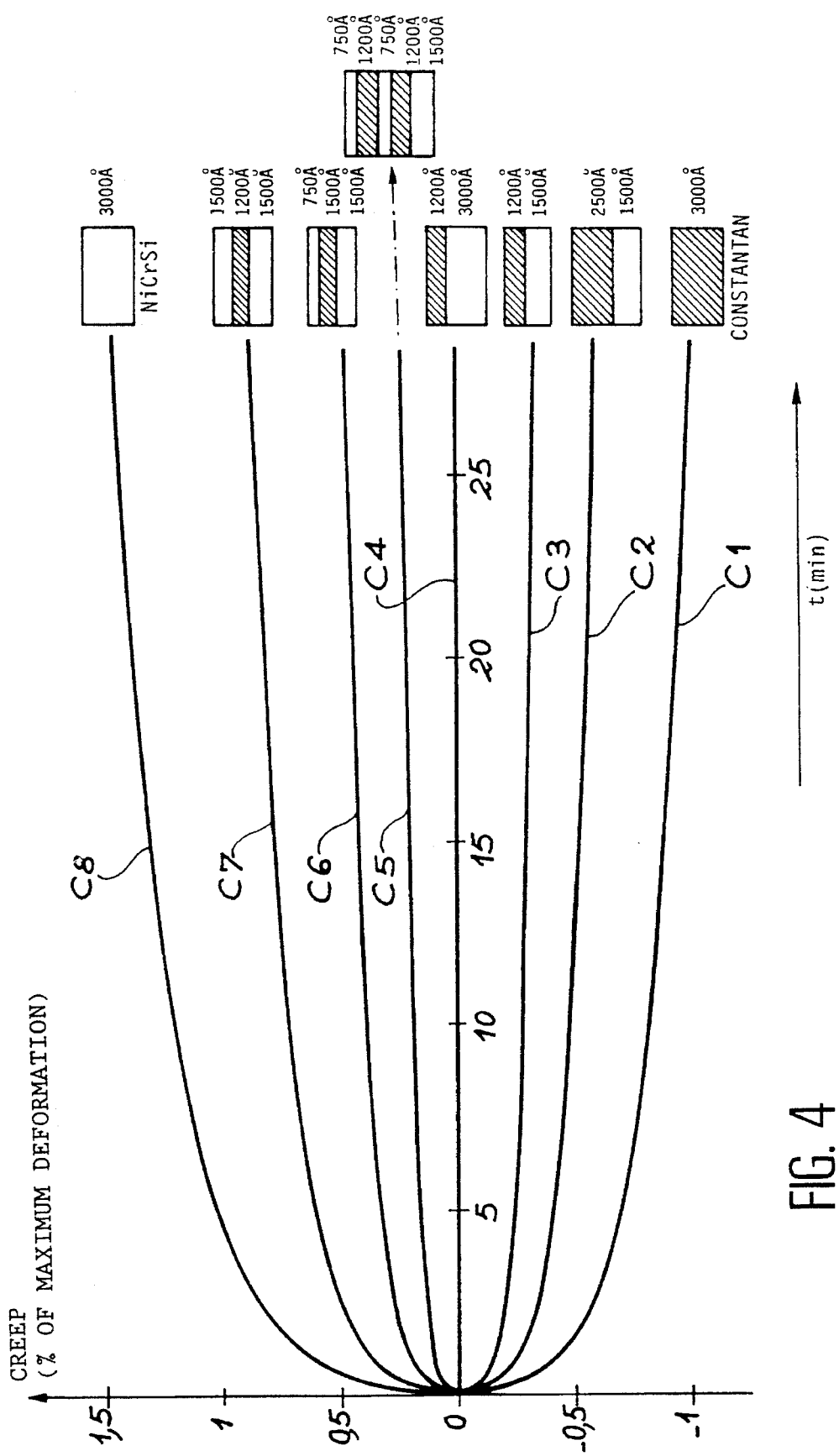

FIG. 4 A curve illustrating the creep as a function of time for strain gauges according to the invention and control gauges.

According to a first embodiment of the invention, the strain gauge illustrated in FIG. 3 has an elongated shape identical to that described in detail relative to FIG. 1. This strain gauge has a flexible support 20 preferably made from a thermosetting polymer and able to resist temperatures of at least approximately 400° C., such as a polyimide.

This flexible support 20 is covered with a deformation-sensitive thin film 22, which is in the form of the resistor described relative to FIG. 1. According to the characteristics of the invention, it incorporates at least two underlying films 24, 26 having different creep values.

The first underlying film 26 is preferably made from an alloy having a positive creep value and in the amorphous state. This underlying film is made from a material chosen from among alloys based on nickel-chromium, platinum-tungsten or copper-nickel. Advantageously the alloy comprises nickel, chromium and silicon. More specifically, it has the following formula: $Ni_xCr_ySi_z$ with $5<z<11$ and $x+y+z=100$. Even more specifically, it comprises by weight, approximately 72% nickel, 18% chromium and 10% silicon. Its temperature coefficient of resistance TCR is close to zero.

The second underlying film 24 is preferably constituted by an alloy having a negative creep value, i.e. which leads to a significant relaxation of the gauge compared with the test body on which it is placed. Preferably, said alloy is in the crystalline state. It is chosen from among alloys based on nickel-chromium, platinum-tungsten or copper-nickel. Advantageously, it is constituted by constantan, i.e. an alloy containing by weight, approximately 55% copper, 44% nickel and 1% manganese. Its temperature coefficient of resistance (TCR) is close to zero.

It is possible to use two constantan types, doped by several impurities, the most important of which are given in the following Table 1. It would also be possible to use zinc, silver or titanium as the dopant.

TABLE 1

|    | constantan no. 1 (µg/g) | constantan no. 2 (µg/g) |
|----|------|------|
| Ca | 935  | 500  |

TABLE 1-continued

|    | constantan no. 1 (µg/g) | constantan no. 2 (µg/g) |
|----|-------------------------|-------------------------|
| Pb | 200                     | 175                     |
| Si | 200                     | 25                      |
| Fe | 420                     | 215                     |
| Al | 60                      | 25                      |
| Mg | 55                      | 615                     |

The first constantan alloy (no. 1) has a TCR close to 0. The second constantan alloy (no. 2) has a higher TCR, but a lower relaxation.

A constantan alloy having a low impurity level has a higher TCR and vice versa. Thus, the quantity of dopants present in the alloy will be adapted as a function of the sought TCR.

Advantageously and as shown in FIG. 3, preferably the alloy underlying film 26 in the amorphous state is directly deposited on the flexible support 20 and then the underlying film 24 is deposited on the underlying film 26. This can also be reversed, but the results obtained are then less homogeneous.

It should be noted that it is not vital for one of the underlying films to have a positive creep value and for the other to have a negative creep value and it is merely sufficient for these values to be different.

The degree of creep of the gauge or more precisely the film 22 is dependent not only on the value of the creep relative to each of the underlying films 24, 26, but also the relative thickness and the number of underlying films 24, 26. The tests described hereinafter were performed with three and five films.

The manufacturing process for the gauges will now be described in greater detail. Multifilm deposits of amorphous (NiCrSi) and crystalline (CuNiMn) alloys took place by cathodic sputtering with a continuous diode using a 25 µm thick, flexible polyimide support 20. This type of deposition process is used because the polyimide polymer must be able to withstand temperatures of 400° C. or higher, reached during the production of the films. Obviously, this temperature value can be lowered by adding cooling systems to the deposition apparatus. The choice of the polymer is dependent on the temperature reached during the deposition of the thin films. This choice falls within the scope of the expert. These thin film deposition methods make it possible to deposit films having thicknesses between $50 \cdot 10^{-10}$ m and $10000 \cdot 10^{-10}$ m and to have very high resistances per length unit. These resistances or resistors are etched by chemical etching following the geometry of FIGS. 1 or 3 using a single mask for the different multifilm arrangements (i.e. a single loop length 15). For example, the connectors 28 are then deposited through a mask at the two ends of each gauge by vacuum evaporation of a thickness of 100 Å chromium, 3000 Å nickel and 3000 Å gold. Finally, the gauges obtained are bonded to the test body so as to form a transducer. In the manner illustrated in FIG. 2 they can be arranged in Wheatstone bridge form. Connecting wires are then welded to the connectors using a soldering iron and e.g. a tin - lead alloy.

Test performed on strain gauges having the structure according to the invention.

The gauges were installed on a test body in a Wheatstone bridge arrangement. The test body is intended to perform a weighing operation between 0 and 3 kg. This test body has a creep with an intermediate value with respect to all the test bodies generally used for weighing purposes. FIG. 4 illustrates the measurements performed applying a maximum load and taking unbalanced readings of the Wheatstone bridge for 30 minutes. The curves represent the creep (i.e. the deformation in ‰ of the maximum deformation), as a function of time. The tests were performed with a gauge having a flexible polyimide support covered with one or more crystalline constantan or amorphous NiCrSi underlying films. In front of each curve is also shown the corresponding section of the gauge without the support film 20 and the relative thicknesses of the constantan and the NiCrSi alloy.

Curve C1 represents the resultant obtained with a single constantan film and forms a control. The creep is $-1 \cdot 10^{-3}$ after 30 minutes.

Curves C2, C3 and C4 demonstrate the reduction of the relaxation effect (increase of the creep value) due to the increase in the thickness of the underlying NiCrSi film compared with that of constantan. Curve C4 corresponds to a creep of the gauge which precisely compensates the creep of the test body.

Curves C5, C6 and C7 represent the results displaced towards the positive creep values, obtained with alternating underlying films of NiCrSi alloy and constantan. It should be noted that the same curves could be obtained with only two underlying films by increasing the thickness of the NiCrSi alloy compared with that of the constantan.

Finally, for comparison, curve C8 shows the creep of the test body obtained with a NaCrSi alloy film only. This value is $1.4 \cdot 10^{-3}$ after 30 minutes. In this case, the metal film perfectly follows the test body and the gauge has no relaxation. The strain gauges according to the invention have a particular application in precision weighing for weight/price scales.

As a function of the particular application and especially the desired creep value, a choice will be made of the number and the thickness of the different alloy underlying films.

We claim:

1. Strain gauge for fixing to one of the faces of a test body able to deform under the action of a quantity to be measured, said gauge having a thin film (22) sensitive to deformations, etched in resistor form and fixed to a flexible support (20), characterized in that said thin film (22) has at least two underlying films (24, 26) having different creep values.

2. Strain gauge according to claim 1, characterized in that the flexible support (20) is made from a polyimide able to resist temperatures equal to or higher than approximately 400° C.

3. Strain gauge according to claim 1, characterized in that alloy underlying film (26) having a positive creep value is in direct contact with the flexible support (20).

4. Strain gauge according to claim 1, characterized in that each underlying film (24, 26) having different creep values has a thickness between $50 \cdot 10^{-10}$ m and $10000 \cdot 10^{-10}$ m.

5. Strain gauge according to claim 1, characterized in that the thin film (22) has a multifilm structure with several underlying films (24, 26) having different creep values and different thicknesses.

6. Transducer for measuring a quantity, characterized in that it incorporates at least one strain gauge according to claim 1 fixed to a test body (11) able to deform under the action of said quantity to be measured.

7. Strain gauge according to claim 1, characterized in that one of the underlying films is constituted by an alloy (26) having a positive creep value and the other underlying film of an alloy (24) having a negative creep value.

8. Strain gauge according to claim 7, characterized in that the alloy having a positive creep value (26) is an alloy in the amorphous state.

9. Strain gauge according to claim 8, characterized in that the alloy in the crystalline state and the alloy in the amorphous state are selected from the group consisting of alloys based on nickel-chromium, platinum-tungsten and copper-nickel.

10. Strain gauge according to claim 8, characterized in that the alloy has a temperature coefficient of resistance close to 0.

11. Strain gauge according to claim 4, characterized in that the alloy having a positive creep value (26) is an alloy of composition $Ni_xCr_ySi_z$ with $5<z<11$, $x+y+z=100$.

12. Strain gauge according to claim 11, characterized in that the alloy (26) has by weight approximately 72% nickel, 18% chromium and 10% Si.

13. Strain gauge according to claim 7, characterized in that the alloy having a negative creep value (24) is an alloy in the crystalline state.

14. Strain gauge according to claim 13, characterized in that the alloy has a temperature coefficient of resistance close to 0.

15. Strain gauge according to claim 13, characterized in that the alloy (24) having a negative creep value is doped with an element selected from the group consisting of calcium, lead, silicon, iron, aluminum, magnesium, zinc, silver and titanium.

16. Strain gauge according to claim 12, characterized in that the alloy (24) having a negative creep value is a copper, nickel and manganese alloy.

17. Strain gauge according to claim 16, characterized in that the alloy (24) contains by weight approximately 55% copper, 44% nickel and 1% manganese.

18. Strain gauge according to claim 13, characterized in that the alloy in the crystalline state (24) and the alloy in the amorphous state (26) are selected from the group consisting of alloys based on nickel-chromium, platinum-tungsten and copper-nickel.

19. Strain gauge according to claim 18, characterized in that the alloy (24) having a negative creep value is doped with an element selected from the group consisting of calcium, lead, silicon, iron, aluminum, magnesium, zinc, silver and titanium.

20. Strain gauge according to claim 18, characterized in that the alloy having a positive creep value is an alloy of composition $Ni_xCr_ySi_z$ with $5<z<11, x+y+z=100$.

21. Strain gauge according to claim 20, characterized in that the alloy (26) has by weight approximately 72% nickel, 18% chromium and 10% Si.

\* \* \* \* \*